(12) United States Patent
Egnor

(10) Patent No.: US 7,676,745 B2
(45) Date of Patent: Mar. 9, 2010

(54) DOCUMENT SEGMENTATION BASED ON VISUAL GAPS

(75) Inventor: Daniel Egnor, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/177,587

(22) Filed: Jul. 22, 2008

(65) Prior Publication Data

US 2008/0282151 A1    Nov. 13, 2008

Related U.S. Application Data

(63) Continuation of application No. 11/024,851, filed on Dec. 30, 2004, now Pat. No. 7,421,651.

(51) Int. Cl.
    *G06F 17/00* (2006.01)
(52) U.S. Cl. .................. 715/243; 715/234; 715/273
(58) Field of Classification Search ............. 715/234, 715/243, 246, 253, 273, 241, 255
    See application file for complete search history.

(56) References Cited

U.S. PATENT DOCUMENTS

| | | | |
|---|---|---|---|
| 5,555,362 A * | 9/1996 | Yamashita et al. .......... 715/209 |
| 6,112,168 A * | 8/2000 | Corston et al. ................. 704/9 |
| 6,851,105 B1 | 2/2005 | Coad et al. |
| 7,117,199 B2 | 10/2006 | Frank et al. |
| 7,142,728 B2 | 11/2006 | Wnek |
| 7,480,858 B2 * | 1/2009 | Chen et al. ................... 715/234 |
| 7,574,659 B2 * | 8/2009 | Szabo ......................... 715/738 |
| 2002/0029232 A1 | 3/2002 | Bobrow et al. |
| 2002/0085039 A1 * | 7/2002 | Blower et al. ............... 345/776 |
| 2003/0007000 A1 * | 1/2003 | Carlson et al. .............. 345/713 |
| 2003/0034995 A1 * | 2/2003 | Osborn et al. ............... 345/713 |
| 2003/0176931 A1 * | 9/2003 | Pednault et al. .............. 700/31 |
| 2003/0200192 A1 | 10/2003 | Bell et al. |
| 2004/0021679 A1 * | 2/2004 | Chapman et al. ............ 345/700 |
| 2004/0078750 A1 | 4/2004 | Frank |
| 2004/0125124 A1 * | 7/2004 | Kim et al. ................... 345/716 |

(Continued)

FOREIGN PATENT DOCUMENTS

WO    01/63479    8/2001

OTHER PUBLICATIONS

Myers, Brad A., et al, "A Multi-View Intelligent Editor for Digital Video Libraries", JCDL '01: Proceedings of the 1st ACM/IEEE-CS Joint Conference on Digital Libraries, Jan. 2001, pp. 106-115.*

(Continued)

*Primary Examiner*—Laurie Ries
(74) *Attorney, Agent, or Firm*—Harrity & Harrity, LLP

(57) ABSTRACT

A document may be segmented based on a visual model of the document. The visual model is determined according to an amount of visual white space or gaps that are in the document. In one implementation, the visual model is used to identify a hierarchical structure of the document, which may then be used to segment the document.

20 Claims, 9 Drawing Sheets

U.S. PATENT DOCUMENTS

2004/0205461 A1  10/2004  Kaufman et al.
2004/0261016 A1  12/2004  Glass et al.
2005/0028077 A1* 2/2005  Wen et al. ................ 715/500.1

OTHER PUBLICATIONS

Naaman, Mor, et al, "Automatic Organization for Digital Photographs with Geographic Coordinates", JCDL '04: Proceedings of the 4th ACM/IEEE-CS Joint Conference on Digital Libraries, Jun. 2004, pp. 53-62.*

Fraternali, Piero, et al., "Model-Driven Development of Web Applications: The AutoWeb System", ACM Transactions on Information Systems (TOIS), vol. 18, Issue 4, Oct. 2000, pp. 323-382.

Yu, Shipeng, et al., "Information Retrieval: Improving Pseudo-Relevance Feedback in Web Information Retrieval Using Web Page Segmentation", Proceedings of the 12th International Conference on World Wide Web WWW'03, May 2003, pp. 11-18.

* cited by examiner

My Favorite Restaurants

Cafe Borrone
1010 El Camino Real, Menlo Park, California.
 Cafe Borrone is my favorite breakfast place. Parking is easy in the underground garage. I meet friends and colleagues for breakfast here at least once a month! My favorite is their #2 breakfast -- eggs scrambled with Black Forest Ham and Cheddar.

Carpaccio
1120 Crane Street, Menlo Park, California.
 Our old standby dinner place in Menlo Park. This is the place for Italian food in Menlo Park. You can spend more (Del Baffo) but you can't get better price performance than at Carpaccio.

Left Bank
635 Santa Cruz Avenue, Menlo Park, California.
 A wonderful French bistro restaurant on Santa Cruz Avenue in downtown Menlo Park. Great private room upstairs in back. Had fabulous wild salmon on bed of the sweetest creamed corn in memory! Pork with spaetzle is always great. Braised veal cheeks make a wonderful stew. Wonderful desserts. Great wine.

TOP RESTAURANTS IN FAIRFAX, VA ~510

500

520-1 — CHINESE

The Hunan Eatery on University Drive specializes in good eats. They make excellent fried rice and soups! Hunan Eatery, 4008 University Dr, Fairfax, VA. ~530-1

Looking for great noodles, check out Noodles & Co. This place is great and their food is reasonably priced. 10296 Main Street, Fairfax, VA. ~530-2

520-2 — ITALIAN

Cafe Italia is by far my favorite Italian joint. All of their desserts are excellent, particularly the tiramisu. 10515 Main Street, Fairfax, VA. ~530-3

If I had to pick one place that everyone will like, it's the Florentine Restaurant. A large selection of pasta and chicken dishes. Located at 4004 University Dr, Fairfax, VA. ~530-4

DOCUMENT SEGMENTATION BASED ON VISUAL GAPS

RELATED APPLICATIONS

This application is a continuation of U.S. application Ser. No. 11/024,851, filed Dec. 30, 2004, the disclosure of which is incorporated herein by reference.

BACKGROUND

A. Field of the Invention

Concepts described herein relate to search engines and, more particularly, to segmenting documents for indexing by a search engine.

B. Description of Related Art

The World Wide Web ("web") contains a vast amount of information. Locating a desired portion of the information, however can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links.

In an attempt to increase the relevancy and quality of the web pages returned to the user, a search engine may attempt to sort the list of hits so that the most relevant and/or highest quality pages are at the top of the list of hits returned to the user. For example, the search engine may assign a rank or score to each hit, where the score is designed to correspond to the relevance and/or importance of the web page.

Local search engines may attempt to return relevant web pages within a specific geographic region. One type of document that is particularly useful for local search engines are business listings, such as a business listing found in a yellow pages directory. When indexing a business listing, it may be desirable to associate other information with the business listing, such as discussions or reviews of the business that are found in other web pages. For example, a web page may include a list of restaurants in a particular neighborhood and a short synopsis or review of each restaurant. It is desirable for the local search engine to accurately associate the text corresponding to each restaurant with the restaurant. Doing so can, for example, increase the search engine's knowledge of the business and thus allow it to potentially provide more relevant results to the user.

SUMMARY

One aspect is directed to a method for segmenting a document. The method includes generating a visual model of the document, identifying a hierarchical structure of the document based on the visual model, and segmenting the document based on the hierarchical structure and on the visual model of the document.

Another aspect is directed to a method of indexing a document. The method includes identifying geographic signals in the document and segmenting the document into sections that correspond to different ones of the identified geographic signals based on a visual layout of the document. The method further includes indexing text in the sections of the document as corresponding to business listings associated with the geographic signals.

Yet another aspect is directed to a device that includes a processor and a computer-readable memory. The memory includes programming instructions that when executed by the processor cause it to obtain a document that includes geographic signals, segment the document into sections that correspond to different ones of the identified geographic signals based on a visual layout of the document, and index text in the sections of the document as corresponding to business listings associated with the geographic signals.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 is a diagram of an exemplary document illustrating aspects consistent with the invention;

FIG. 5 is a diagram illustrating a portion of an exemplary document;

DETAILED DESCRIPTION

The following detailed description of the invention refers to the accompanying drawings. The detailed description does not limit the invention.

Overview

A local search engine is described that returns local documents, such as web documents and business listings, in response to a local search query. When indexing and/or categorizing a document, the search engine may use information from other documents to help describe the document. For example, a third party restaurant review may be used to augment the search engine's ability to retrieve relevant restaurants or return the relevant restaurants in response to a search query relating to restaurants.

Some documents, such as some web documents, may contain descriptive information for a number of different business listings. FIG. 1 is a diagram of an exemplary document containing descriptive information for three different restaurants, "Café Borrone," "Carpaccio," and "Left Bank." The descriptions of the restaurants are each in the paragraph following the restaurant name. From the point of view of the reader, the document's visual structure, such as its use of white space, clearly distinguishes which description corresponds to which restaurant. Conventional automated techniques for analyzing a document, such as that in FIG. 1, can have difficulty distinguishing the appropriate text that corresponds to each restaurant. These conventional techniques may rely on the underlying document structure, such as, for a hyper-text markup language (HTML) document, the document object model (DOM), to attempt to determine a hierarchical structure of the document. The underlying document structure, however, does not always correspond to the displayed visual structure of the document. Accordingly, such techniques can be inadequate.

Consistent with aspects of the invention, a segmentation component may automatically segment documents based on the visual layout of the document.

Exemplary Network Overview

Figure 2:
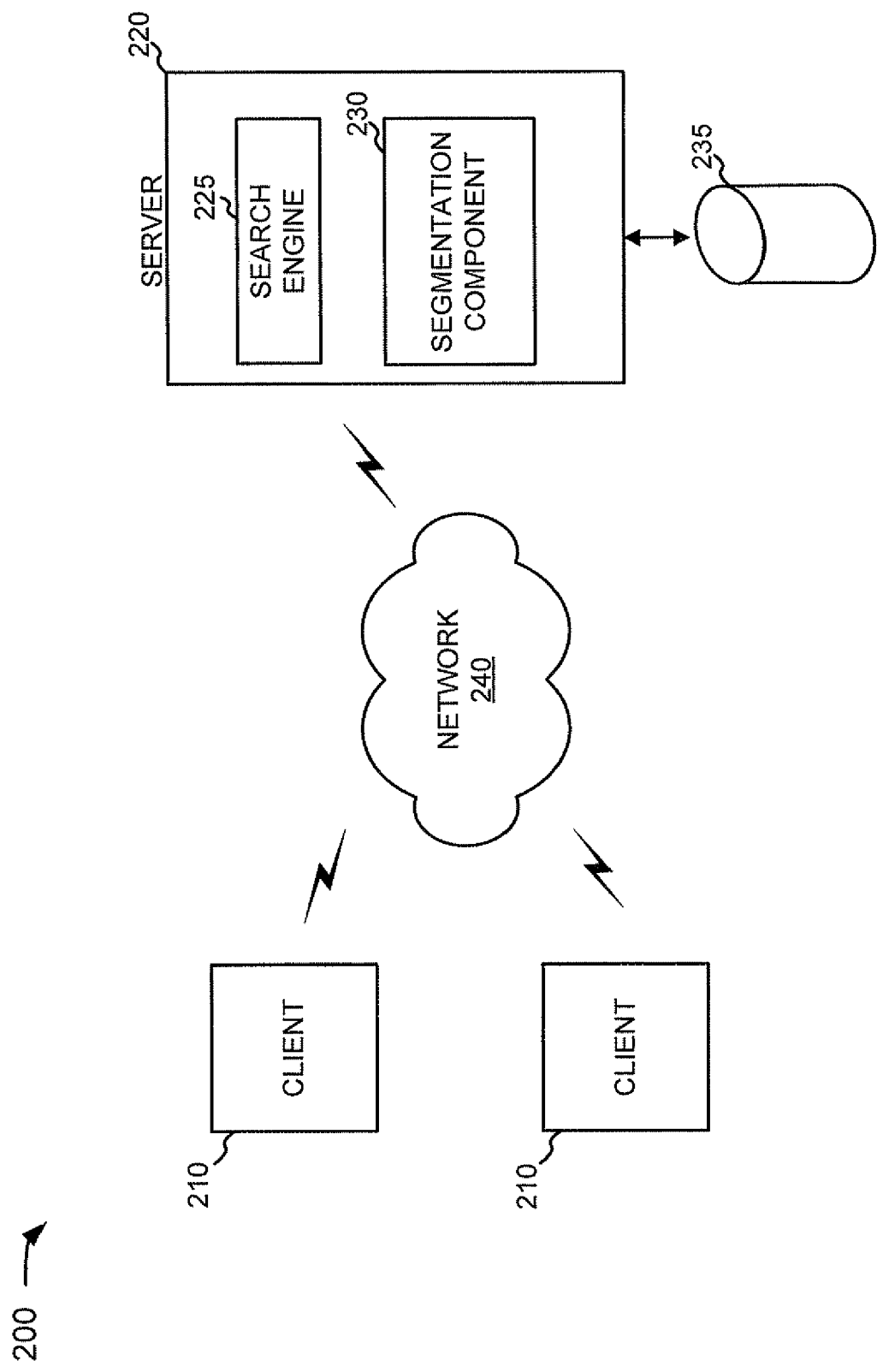
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Clients 210 and server 220 may connect to network 240 via wired, wireless, or optical connections.

A client 210 may include a device, such as a wireless telephone, a personal computer, a personal digital assistant (PDA), a lap top, or another type of computation or communication device, a thread or process running on one of these devices, and/or an object executable by one of these devices. Server 220 may include a server device that processes, searches, and/or maintains documents. Clients 210 and server 220 may connect to network 240 via wired, wireless, or optical connections.

Server 220 may include a search engine 225 usable by clients 210. Search engine 225 may be a local search engine designed to return documents having local relevance to the users. Server 220 may include segmentation component 230. Segmentation component 230 may assist search engine 225 in indexing or classifying documents by automatically segmenting documents having local relevance into sections that correspond to different local regions or addresses.

The local documents processed by search engine 225 may be indexed and stored in a data structure, such as database 235. The documents in database 235 may be local in the sense that they are associated with a particular geographic area—though not necessarily the same geographic area. A document that relates to a business listing, for example, can be considered a local document because it is associated with the particular address of the business.

A document, as the term is used herein, is to be broadly interpreted to include any machine-readable and machine-storable work product. A document may be an e-mail, a business listing, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as Javascript, etc.).

Exemplary Client/Server Architecture

Figure 3:
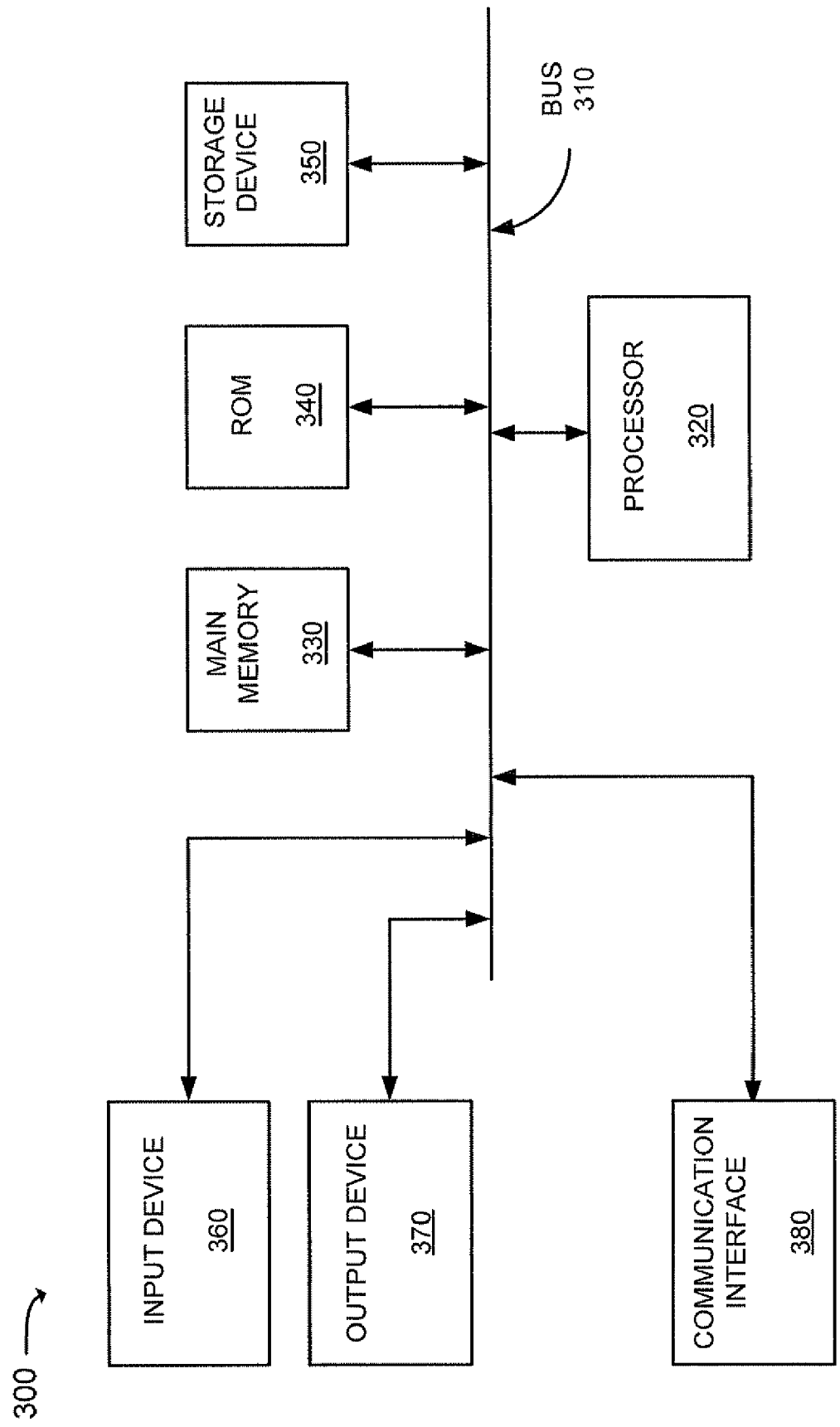
FIG. 3 is an exemplary diagram of a client or server of FIG. 2 according to an implementation consistent with the principles of the invention.

FIG. 3 is an exemplary diagram of a client 210 or server 220, referred to as computing device 300, according to an implementation consistent with the principles of the invention. Computing device 300 may include a bus 310, a processor 320, a main memory 330, a read only memory (ROM) 340, a storage device 350, an input device 360, an output device 370, and a communication interface 380. Bus 310 may include a path that permits communication among the components of computing device 300.

Processor 320 may include any type of conventional processor, microprocessor, or processing logic that may interpret and execute instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include a conventional mechanism that permits a user to input information to computing device 300, such as a keyboard, a mouse, a pen, voice recognition and/or biometric mechanisms, etc. Output device 370 may include a conventional mechanism that outputs information to the user, including a display, a printer, a speaker, etc. Communication interface 380 may include any transceiver-like mechanism that enables computing device 300 to communicate with other devices and/or systems. For example, communication interface 380 may include mechanisms for communicating with another device or system via a network, such as network 240.

Server 220, consistent with the principles of the invention, performs certain searching or document retrieval related operations through search engine 225 and/or segmentation component 230. Search engine 225 and/or segmentation component 230 may be stored in a computer-readable medium, such as memory 330. A computer-readable medium may be defined as one or more physical or logical memory devices and/or carrier waves.

The software instructions defining search engine 225 and/or segmentation component 230 may be read into memory 330 from another computer-readable medium, such as data storage device 350, or from another device via communication interface 380. The software instructions contained in memory 330 cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Segmentation Component Processing

Figure 4:
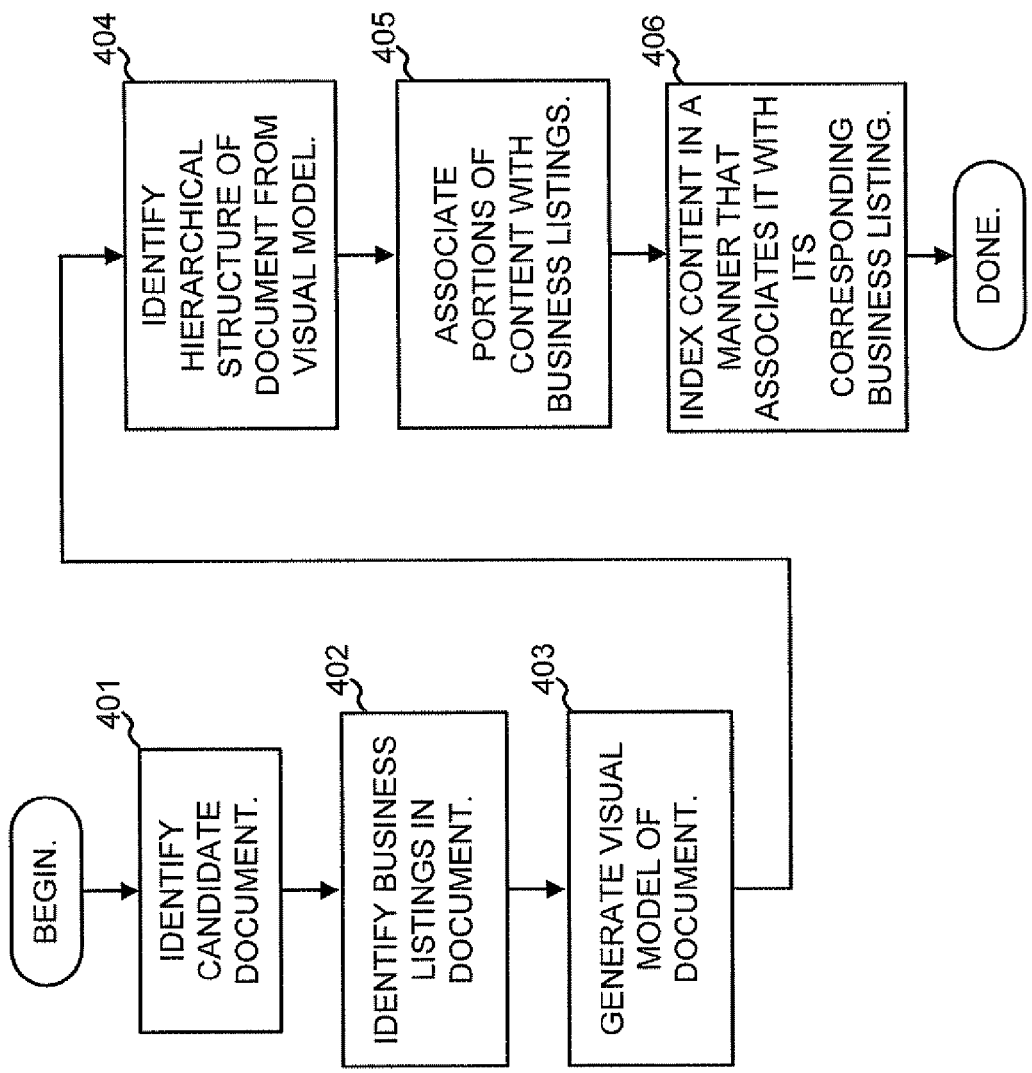
FIG. 4 is a flow chart illustrating exemplary operations consistent with aspects of the invention for segmenting documents having local relevance.

FIG. 4 is a flow chart illustrating exemplary operations consistent with aspects of the invention for segmenting documents having local relevance. In general, segmentation component 230 may segment a document based on the visual layout of a document.

Segmentation component 230 may identify a candidate document for segmentation (act 401). A candidate document may be one that is identified to have one or more geographic signals relating to business listings. The geographic signals may include information associated with a location, such as a full or partial address of the location, a full or partial telephone number, and/or a full or partial name of a business associated with the location. The locations of the geographic signals within a document may be stored in database 235 by, for example, storing a word or character count that indicates where in the document each of the geographic signals is located.

The business listings in the document may be identified (act 402) based on the geographic signals. For instance, a business listing may be identified when a geographic signal can be determined to define a complete address and a business name. In some implementations, yellow page data or other pre-generated lists of businesses can be used to verify the identified business names/addresses.

FIG. 5 is a diagram illustrating a portion of an exemplary document 500. Exemplary document 500 is a HTML web document reviewing a number of restaurants. As shown, document 500 may include a document header 510, category labels 520-1 and 520-2, and individual restaurant reviews 530-1 through 530-4. As can be seen, document 500 includes four business listings, one of which is associated with each of reviews 530-1 through 530-4. When indexing this document, it would be desirable to associate each of the reviews with its corresponding business listing and not with any of the other business listings in document 500. Additionally, header information, such as document header 510 and category labels 520 can include useful descriptive information that may beneficially be associated with the business listings.

In situations in which document 500 is a web page, document 500 may be generated using a markup language, such as HTML. The particular HTML elements and style used to layout different web pages varies greatly. Although HTML is based on a hierarchical document object model (DOM), the hierarchy of the DOM is not necessarily indicative of the visual layout or visual segmentation of the document.

Segmentation component 230 may generate a visual model of the candidate document (act 403). The visual model may be particularly based on visual gaps or separators, such as white space, in the document. In the context of HTML, for instance, different HTML elements may be assigned various weights (numerical values) that attempt to quantify the magnitude of the visual gap introduced into the rendered document. In one implementation, larger weights may indicate larger visual gaps. The weights may be determined in a number of ways. The weights may, for instance, be determined by subjective analysis of a number of HTML documents for HTML elements that tend to visually separate the documents. Based on this subjective analysis weights may be initially assigned and then modified ("tweaked") until documents are acceptably segmented. Other techniques for generating appropriate weights may also be used, such as based on examination of the behavior or source code of Web browser software or using a labeled corpus of hand-segmented web pages to automatically set weights through a machine learning process.

As an example of assigned weights, consider the HTML element <hr> (horizontal rule). The <hr> element may introduce a weight of 20 before and after the element. As another example, the HTML elements <h1> through <h6> are used to start new headings in which <h1> is the most prominent and <h6> is the least prominent. The corresponding elements </h1> through </h6> are used to end the headings. The various headings may, for example, be assigned weights such as, for <h2>, a weight of 50 before and 30 after the element (i.e., <h2> may be assigned a weight of 50 and </h2> a weight of 30. This reflects the concept that heading text is more likely to be associated with what comes after it than what comes before it.

Figure 6:
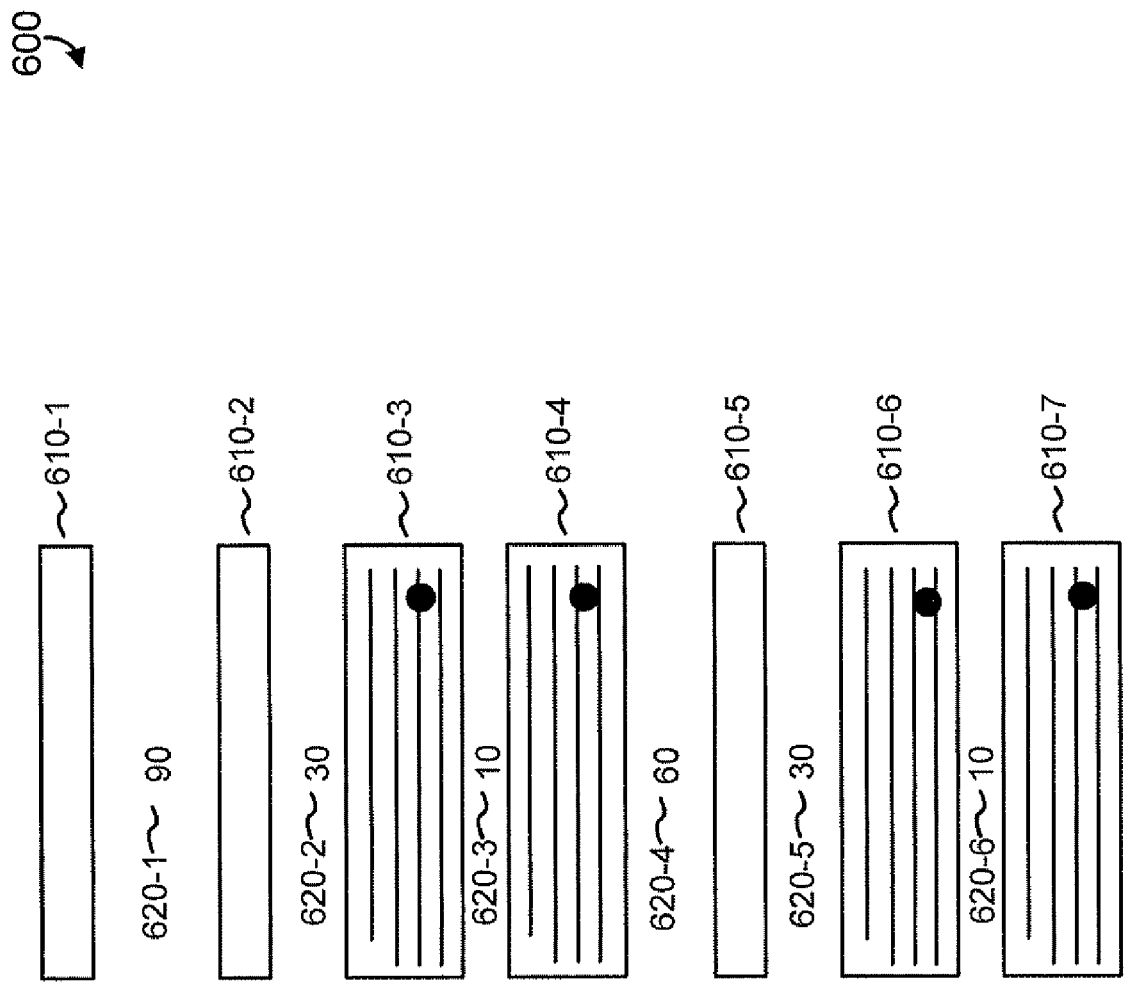
FIG. 6 is a diagram conceptually illustrating a visual model of a document.

FIG. 6 is a diagram conceptually illustrating a visual model of document 500. Visual model 600 includes a number of textual elements 610-1 through 610-7, which correspond to the textual elements (document header 510, category label 520-1, reviews 530-1 and 530-2, category label 520-2; and reviews 530-3 and 530-4, respectively) shown in FIG. 5. Weights 620-1 through 620-6 are assigned between textual elements 620-1 through 620-6. The circles shown in textual elements 610-3, 610-4, 610-6, and 610-7 represent the corresponding business listing shown in FIG. 5.

For the exemplary visual model 600, assume that text 610-2 and 610-5 are implemented as <h2> HTML elements, which correspond to weight values of 30 for weights 620-2 and 620-5, and the weight value of 60 (50 from text 610-5 and 10 from text 610-4) for weight 620-4. Weight 620-1, having a value of 90, may be calculated as the sum of the weight associated with text 610-2 (50) and the weight associated with the document header in text 610-1. Document header text 610-1 may be implemented using, for example, a number of HTML <br> (break) elements or as an HTML header element that contribute(s), for example, a weight value of 40 to the total value of weight 620-1. Weights 620-3 and 620-6 may be based on, for example, <br> elements after each of the document reviews 530 (i.e., text 610-3, 610-4, 610-6, and 610-7).

Returning to FIG. 4, the hierarchical structure of the document may be determined based on the visual model (act 404). In one implementation, different weights may define different hierarchical levels, in which larger weights define higher levels. The lowest level may be determined as a minimum weight that divides the textual elements containing geographic signals.

Figure 7:
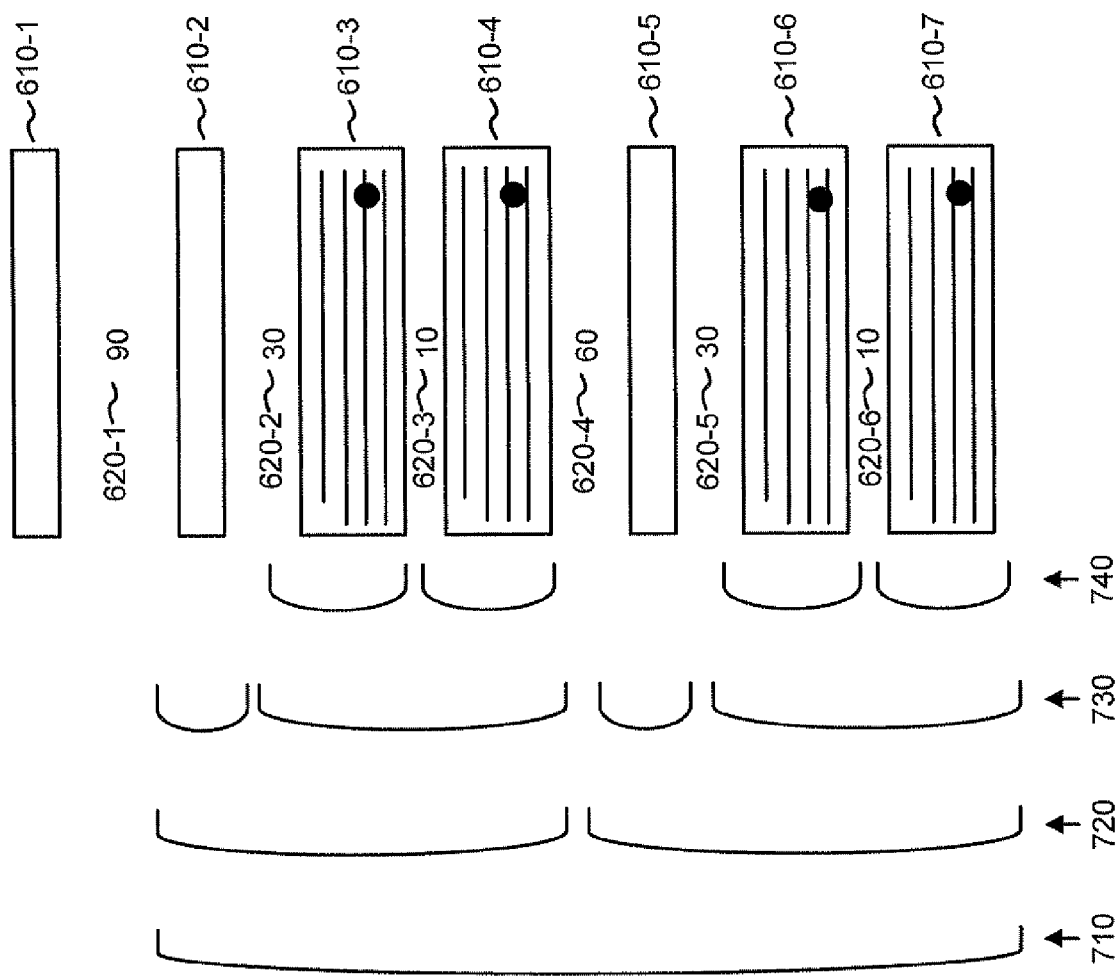
FIG. 7 is an exemplary diagram of a visual model illustrating a hierarchical structure for document.

FIG. 7 is a diagram of visual model 600 illustrating a hierarchical structure for document 500. Brackets are used to indicate hierarchical regions. In this example, weight 620-1 is the largest weight and is near the top of the document, and may thus indicate that text 610-1 is the document title or header (hierarchical level 710). At the next hierarchical level (hierarchical level 720), weights 620-1 and 620-4 define two divisions of three text sections each. Within this hierarchical level (hierarchical level 730), weights 620-2 and 620-5 separate the sections. Finally, weights 620-3 and 620-6 separate text sections 610-3 and 610-4, and text sections 610-6 and 610-7 (hierarchical level 740). These text sections include the geographic signals.

Based on the hierarchical levels determined in act 404, portions of the document may be associated with the business listings in the document (act 405). In one implementation, the text associated with the smallest hierarchical level surrounding a business listing may be associated with that business listing. Additionally, text at higher levels that is not associated with a different business listing may be associated with the business listing. In the example of FIGS. 5 and 6, for instance, text 530-2/610-4 may be associated with the business listing for the restaurant "Noodles & Co.," as well as with the text "Chinese" and the title "Top Restaurants in Fairfax, Va."

The content determined for each of the business listings may be associated with the appropriate business listing in database 235 (act 406). The business listing and its associated content may be indexed as a single combined document. In alternate implementations, the business listing and its corresponding content may be indexed separately but associated with one another via a special field in the index. In the examples of FIGS. 5-7, for instance, the business listing for "Hunan Eatery, 4008 University Drive, Fairfax, Va.," may be associated with review text 530-1, category label 520-1, and header 510.

Although the segmentation process described with reference to FIGS. 4-7 was described as segmenting a document based on geographic signals that correspond to business listings, the general hierarchical segmentation technique could more generally be applied to any type of signal in a document. For example, instead of using geographic signals that correspond to business listings, images in a document may be used (image signals). The segmentation process may then be applied to help determine what text is relevant to what image. Alternatively, the segmentation process described with reference to acts 403 and 404 may be performed on a document without partitioning the document based on a signal. The identified hierarchical segments may then be used to guide classifiers that identify portions of documents which are more or less relevant to the document (e.g., navigational boilerplate is usually less relevant than the central content of a page).

Example Search

Figure 8:
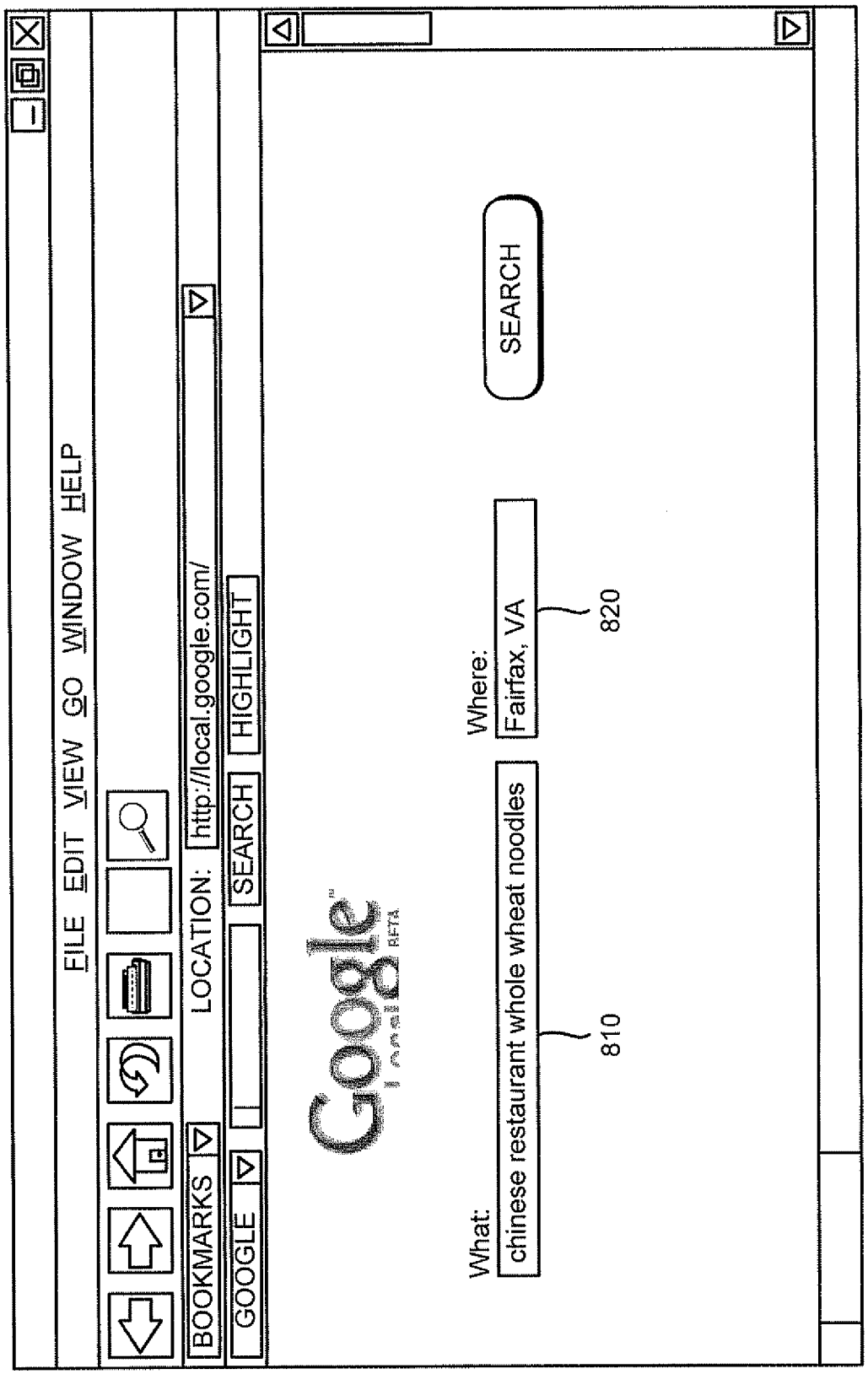
FIGS. 8 and 9 are exemplary diagrams of user interfaces that may be presented to a user according to an implementation consistent with the principles of the invention.
Figure 9:
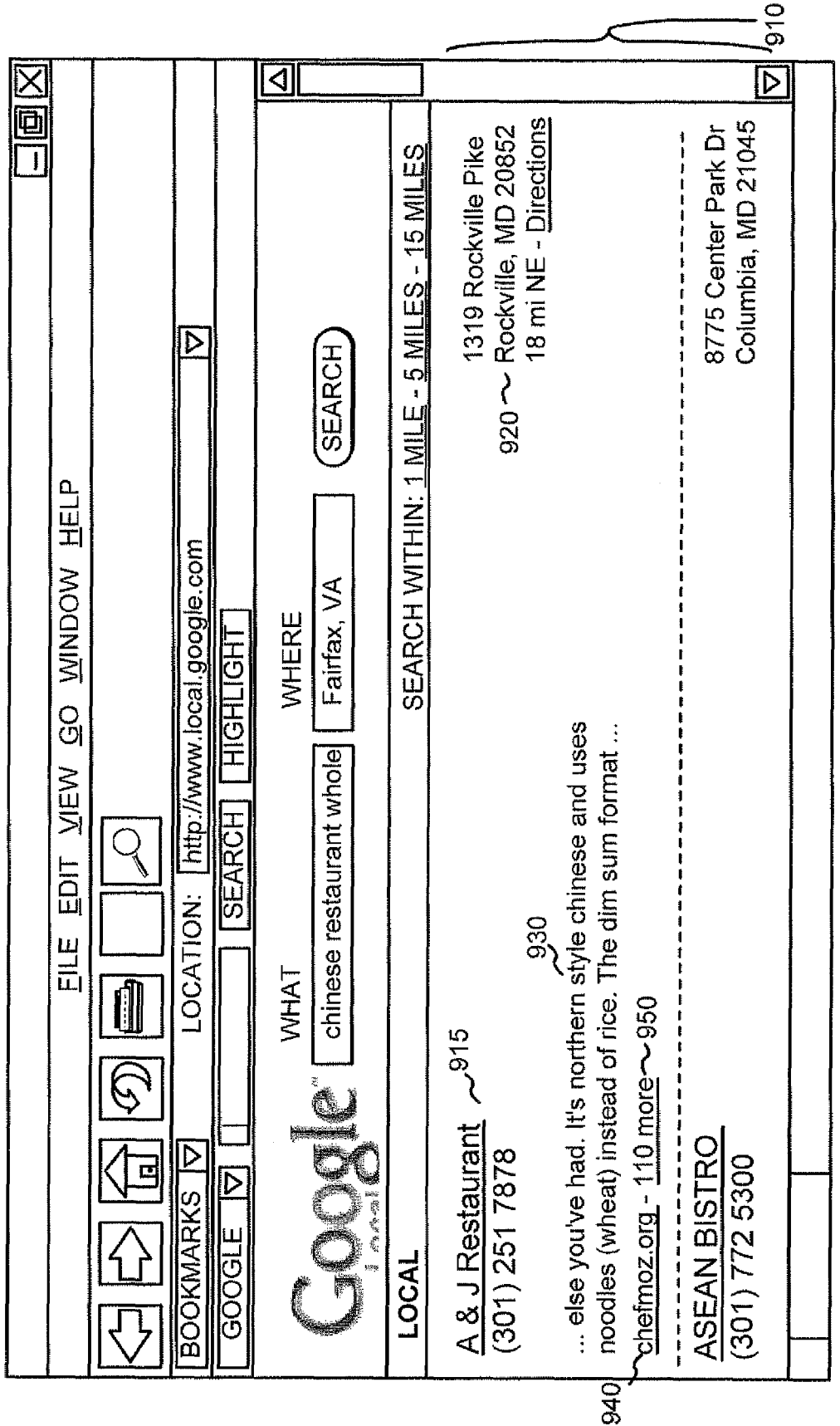

FIGS. 8 and 9 are exemplary diagrams of user interfaces that may be presented to a user according to an implementation consistent with the principles of the invention. Assume that the user has accessed an interface associated with a local search engine, such as search engine 225 (FIG. 2). As shown in FIG. 8, the user may enter one or more search terms of a search query via a search field 810. The user may additionally enter a geographical region of interest in search field 820. In this example, the user has entered the search query "Chinese restaurants whole wheat noodles" and has indicated that the search should be performed in the geographic region corresponding to "Fairfax, Va."

Search engine 225 may implement the search over the pre-indexed document corpus stored in database 235. The index may have been generated using the techniques discussed above, such that business listings for Chinese restaurants may have also been associated with additional information that helps to more fully categorize and/or describe the business listings. In this case, search engine 225 may be able to locate a Chinese Restaurant in Fairfax, Va. that serves whole wheat noodles.

As shown in FIG. 9, search engine 225, via a user interface, may present local search results 910. For each of search results 910 (or some subset of the search results), the user interface may provide address information for the business associated with or mentioning the search result, a telephone number for the business, a snippet from a document associated with the business, a link to more information associated with the business, a link to directions to the business, and/or a link to one or more documents that refer to the business. The user interface may also provide a map of the area covered by the search. As shown, the first search result 910 includes business name and telephone information 915, address information 920, a snippet 930 from a document that describes the business (where the document may or may not be associated with the business), a link 940 to the document associated with snippet 930, and a link 950 for additional documents that refer to the business.

CONCLUSION

Systems and methods consistent with the principles of the invention may segment a document based on a visual model of the document. The segmented document may be used to associate different portions of the document with different items, such as different geographic signals/business listings.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 4, the order of the acts may be modified in other implementations consistent with the principles of the invention. Further, non-dependent acts may be performed in parallel.

Also, exemplary user interfaces have been described with respect to FIGS. 8 and 9. In other implementations consistent with the principles of the invention, the user interfaces may include more, fewer, or different pieces of information.

Further, certain portions of the invention have been described as an "engine" that performs one or more functions. An engine may include hardware, such as an application specific integrated circuit or a field programmable gate array, software, or a combination of hardware and software.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method, performed by a computer system, the method comprising:
    generating, by a processor associated with the computer system, a visual model of a document that includes a geographic signal;
    identifying, by a processor associated with the computer system, a hierarchical structure of the document based on the visual model;
    segmenting, by a processor associated with the computer system, the document based on the hierarchical structure and the visual model of the document; and
    associating, by a processor associated with the computer system, a portion of the document as corresponding to the geographic signal, when the portion includes the geographic signal and when the portion is within a lowest level of the hierarchical structure that includes the geographic signal.

2. The method of claim 1, where generating the visual model of the document includes:
    assigning values to elements, of the document, used to control the appearance of the document, the values quantifying an amount that the elements introduce visual gaps in a displayed version of the document.

3. The method of claim 2, where identifying the hierarchical structure of the document includes:
    identifying higher levels of the hierarchical structure for the document as corresponding to assigned values that are larger than other assigned values.

4. The method of claim 2, where the elements of the document are hyper-text markup language (HTML) elements.

5. The method of claim 1, further comprising:
assigning values to elements, of the document, used to control the display of the document, the values quantifying an amount that the elements introduce visual gaps in a displayed version of the document; and
identifying the lowest level of the hierarchical structure based on a smallest value assigned to one of the elements, where the one of the elements surrounds the geographic signal.

6. The method of claim 1, where segmenting the document further includes:
associating sections of text surrounding the geographic signal with the geographic signal.

7. The method of claim 1, further comprising:
associating text in the document as text corresponding to the geographic signal when the text does not itself include the geographic signal and when the text is at a higher hierarchical level in the hierarchical structure than the geographic signal.

8. A computer-readable memory device containing programming instructions for execution by a processor, the computer-readable memory device comprising:
programming instructions to generate a visual model of a document that includes at least one geographic signal;
programming instructions to identify a hierarchical structure of the document based on the visual model; and
programming instructions for associating the at least one geographic signal with portions of the document based on the identified hierarchical structure of the document, the associating including associating text in the document as text corresponding to the at least one geographic signal when the text includes the geographic signal and when the text is within a lowest level of the hierarchical structure that includes the at least one geographic signal.

9. The computer-readable memory device of claim 8, further comprising:
programming instructions to assign values to elements of the document used to control a display of the document, the values quantifying an amount that the elements introduce visual gaps in a displayed version of the document; and
programming instructions to identify the lowest level of the hierarchical structure based on a minimum value of an element that surrounds the geographic signal.

10. The computer-readable memory device of claim 9, further comprising:
programming instructions to assign values to elements of the document used to control an appearance of the document, the values quantifying an amount that the elements introduce visual gaps in a displayed version of the document.

11. The computer-readable memory device of claim 9, further comprising:
programming instructions for associating additional text in the document as text corresponding to the geographic signal when the additional text does not itself include the geographic signal and when the text is at a higher hierarchical level in the hierarchical structure than the geographic signal.

12. A device, comprising:
a processor; and
a memory coupled to the processor and containing instructions that when executed by the processor cause the processor to:
identify a document that includes geographic signals,
segment the document into a plurality of sections that correspond to different ones of the identified geographic signals based on a visual layout of the document, and
index text in the plurality of sections of the document as corresponding to the geographic signals, the indexing including associating text in the document as text corresponding to one of the geographic signals when the text includes the one of the geographic signals and when the text is within a lowest level of the hierarchical structure that includes the one of the geographic signals.

13. The device of claim 12, where the text is indexed to correspond to business listings associated with the geographic signals.

14. The device of claim 12, where the instructions further cause the processor to:
associate text, that is at a higher hierarchical level than a level containing one of the geographic signals and does not itself include a geographic signal, with the geographic signal as header text.

15. The device of claim 12, when segmenting the document into a plurality of sections, the instructions further cause the processor to:
segment the document based on an amount of white space between elements in a displayed version of the document.

16. The device of claim 15, where the instructions further cause the processor to:
assign values to the elements of the documents, the values quantifying an amount of the white space between the elements; and
identifying higher hierarchical levels of the document as corresponding to assigned values that are larger than other assigned values.

17. A method, performed by a computer system, the method comprising:
identifying, by a processor of the computer system, a document that includes information associated with a location;
generating, by a processor of the computer system, a visual model of the document based on gaps between elements in the document;
assigning, by a processor of the computer system, weights to the elements based on a size of the gaps;
identifying, by a processor of the computer system, a hierarchical structure of the document, where levels of the hierarchical structure are based on the weights of the elements;
identifying, by a processor of the computer system, text surrounding the information associated with the location; and
associating by a processor of the computer system, a lowest one of the levels, that includes the text, with the information associated with the geographic location.

18. The method of claim 17, where the elements of the document include hyper-text markup language (HTML) elements.

19. The method of claim 17, where identifying the hierarchical structure of the document includes:
identifying higher hierarchical levels for the document as corresponding to larger weights.

20. The method of claim 17, where the information associated with the geographic location includes an address of a business.

* * * * *